C. E. BRADFORD.
TROLLEY POLE.
APPLICATION FILED SEPT. 19, 1910.
989,112.
Patented Apr. 11, 1911.
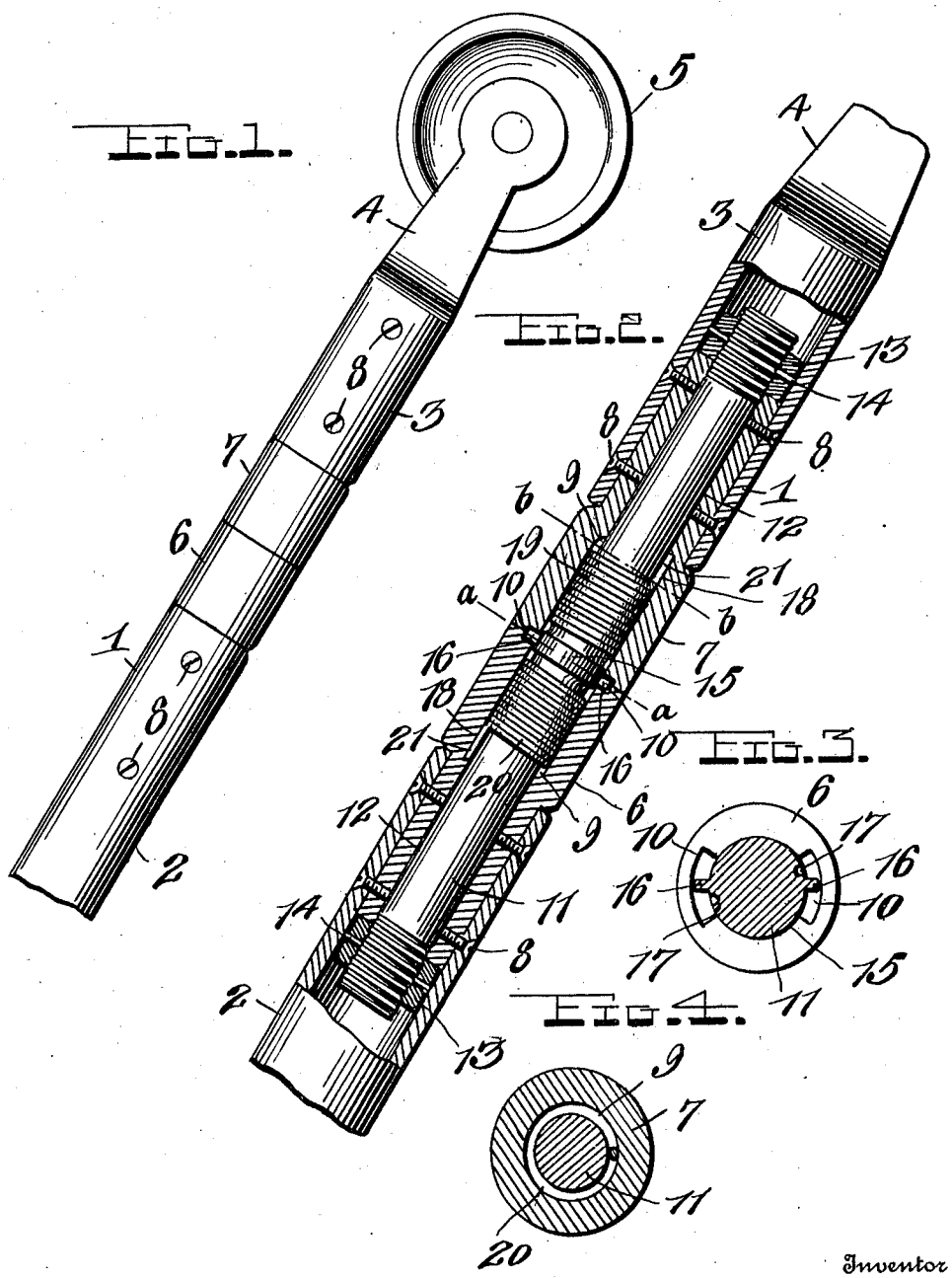
Inventor
C. E. Bradford,
By Watson E. Coleman,
Attorney

UNITED STATES PATENT OFFICE.

CHARLES E. BRADFORD, OF LAKEVIEW, WASHINGTON.

TROLLEY-POLE.

989,112.  Specification of Letters Patent. Patented Apr. 11, 1911.

Application filed September 19, 1910. Serial No. 582,695.

*To all whom it may concern:*

Be it known that I, CHARLES E. BRADFORD, a citizen of the United States, residing at Lakeview, in the county of Pierce and State of Washington, have invented certain new and useful Improvements in Trolley-Poles, of which the following is a specification, reference being had to the accompanying drawings.

This invention relates to improvements in trolley poles, the object of the invention being to provide a trolley pole which comprises a pair of tubular members, with an improved connection between the said members whereby the upper member which carries the trolley wheel will be allowed limited angular movement with respect to the lower member, so that the trolley wheel will be enabled under all conditions to exactly follow the course of the trolley wire and will be less liable to become casually disengaged from the wire, a further object of the invention being to include in the pivotal connection between the members of the trolley pole, a pair of counter-acting springs which serve to normally keep the trolley wheel in the required position and which when the trolley wheel deviates from the direction of movement of the car carrying the pole will automatically return the trolley wheel to the said line.

With the above and other objects in view, the invention consists in the construction, combination and arrangement of devices hereinafter described and claimed.

In the accompanying drawings,—Figure 1 is an elevation of the upper portion of a trolley pole constructed in accordance with my invention. Fig. 2 is a sectional view of the same, the spindle and the reversely coiled springs being shown in elevation. Fig. 3 is a transverse sectional view of the same on the plane indicated by the line *a—a* of Fig. 2, and Fig. 4 is a similar view of the same on the plane indicated by the line *b—b* of Fig. 2.

The trolley pole 1 which is tubular in form is in accordance with my invention, composed of a lower member 2, and an upper member 3 disposed in line with each other, the upper member being provided with a trolley harp 4, of suitable construction, in which is mounted a trolley wheel 5. In the embodiment of my invention here shown, I provide a pair of tubular sleeves 6, 7 which in effect form portions of the members of the trolley pole, and which have their outer ends diametrically reduced, and respectively disposed and secured in the said members, 2, 3, the said reduced portions of the said sleeves being here shown as secured in the said members of the trolley pole by means of screws 8. Any other suitable means may be employed within the scope of my invention for securing the said tubular sleeves in and to the members of the trolley pole. The inner, meeting portions of the tubular sleeves which aline and are concentric with each other, are provided with diametrically enlarged central bores 9, and each tubular sleeve has at its inner end, and on opposite sides, segmental slots 10. A cylindrical spindle 11 extends through the said tubular sleeves and connects them together, and has its bearings in the smaller outer portions of the bores of said tubular sleeves as at 12. Nuts 13 are screwed on the ends of the said spindle, which bear against the outer ends of the tubular sleeve, and are locked to the spindle by cross pins 14, the said tubular sleeves being thereby swivelly mounted on the said spindle so that the upper sleeve with the upper member of the trolley pole may be turned angularly with respect to the lower member thereof, so as to adapt the trolley wheel under all conditions to exactly conform to the course of the trolley wire, and hence prevent the trolley wheel from exerting lateral stresses on the trolley wire, and therefore obviating all tendency of the trolley wheel to become casually disengaged from the trolley wire.

The central portion of the spindle 11, which coincides with the joint between the inner ends of the tubular sleeves, 6, 7, is provided with a circumferential annular flange 15 which fits in the enlarged portions of the bores of said tubular sleeves and is provided on opposite sides with radially extending stop studs 16, which operate in the segmental slots 10, and hence by engagement with the ends of said slots limit the extent of the angular movement between the said tubular sleeves. The said flange is also provided on opposite sides with notches 17 and at the outer ends of the enlarged portions of the bores of said sleeves, are longitudinal grooves 18.

On the central portion of the spindle disposed within the enlarged portions of the bores of said tubular sleeves are reversely coiled springs 19, 20, the inner ends of which are engaged with the notches 17, of the annular flange 15 of the spindle, their outer ends being engaged with the grooves 18 as at 21, and hence the said springs serve to connect the said tubular sleeves, and therefore the members of the trolley pole to the spindle and each spring counter-acts the other, so that while they yieldably connect the members of the trolley pole to the spindle, they, by reason of the reverse disposition of their coils, tend to keep the trolley wheel parallel with a right line representing the course of the car which is equipped with the trolley pole. Any casual deviation of the trolley wheel will be corrected by the springs as will be understood, and hence there will be no tendency of the trolley wheel to become casually disengaged from the trolley wire.

I do not desire to limit myself to the construction, and combination of devices herein shown and described, as the same represent only what I regard as a preferred embodiment of my invention, and modifications may be made within the scope of the appended claims.

I claim:—

1. A trolley pole having tubular alining members disposed end to end, in combination with a spindle connecting said members and to which they are swivelly connected, said members and said spindle having co-acting devices limiting the angular movement of said members with respect to each other, on said spindle, and reversely coiled springs on said spindle and in said members, each of the said springs having one end connected to said spindle, and the other end connected to one of said tubular members.

2. A trolley pole having tubular alining members disposed end to end, and provided in their meeting ends with segmental slots, in combination with a spindle connecting said members and to which they are swivelly connected, said spindle having radial stop studs operating in said slots of said tubular members, and reversely coiled springs on said spindle, and in said tubular members, one end of each spring being connected to said spindle and the other end being connected to one of said tubular members.

In testimony whereof I hereunto affix my signature in the presence of two witnesses.

CHARLES E. BRADFORD.

Witnesses:
   F. D. HILL,
   ELI P. NORTON.

---

Copies of this patent may be obtained for five cents each, by addressing the "Commissioner of Patents, Washington, D. C."